Patented Aug. 26, 1952

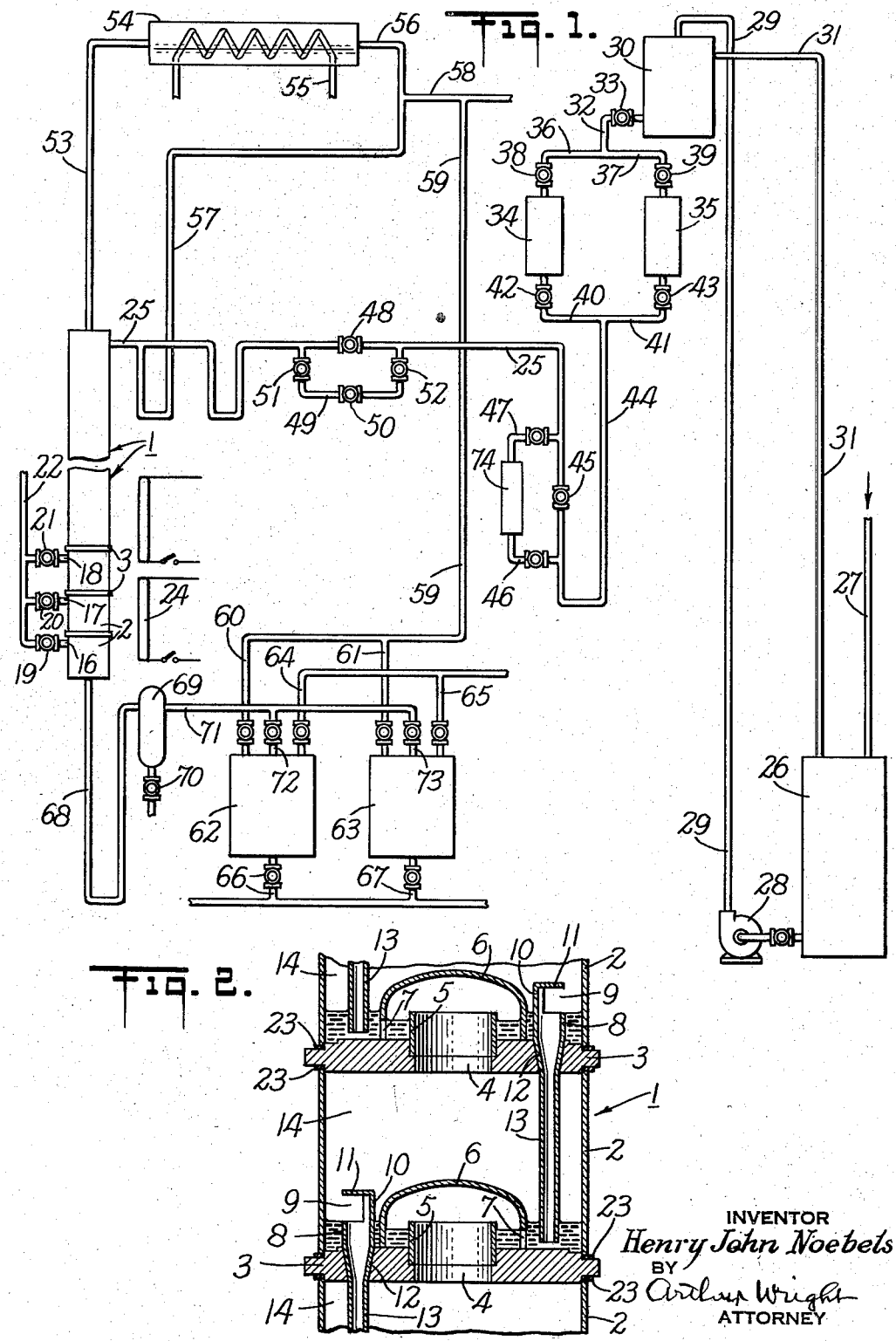

2,608,660

UNITED STATES PATENT OFFICE 2,608,660

APPARATUS FOR HALOGENATION

Henry J. Noebels, Metuchen, N. J., assignor to Heyden Chemical Corporation, New York, N. Y., a corporation of Delaware Application June 13, 1950, Serial No. 167,802

6 Claims. (Cl. 250—43)

My invention relates especially to an apparatus for the halogenation of alkyl substituted benzenes.

An object of my invention is to provide an apparatus for producing such products continuously and which may be obtained thereby with a high uniform yield. Another object is to provide a column having a countercurrent of liquid and vapor providing adequate vapor spaces containing the gaseous halogen which, accordingly, can be effectively irradiated therein with ultraviolet and visible rays. For instance, this may be accomplished in an all-glass bubble cap column so modified and constructed as to provide for conducting the reaction mainly in the said vapor spaces which are substantially unobstructed by light-reflecting and dispersing filling materials.

In accordance with my invention, for example, I provide an apparatus in which an aromatic hydrocarbon is fed into the upper end of an all glass bubble cap plate column having large vapor spaces, effectively irradiated with ultraviolet rays, so as to react in stoichiometric quantity with a halogen admitted in its vapor form to a lower portion of the said column while a mixture of the products formed is being withdrawn from the bottom thereof and hydrocarbon-saturated hydrogen chloride is being withdrawn from the top of the column. With this apparatus it is possible to replace continuously one, two or more of the hydrogen atoms in the alkyl side chain of said hydrocarbon, etc. with halogen atoms in said vapor spaces, and mainly in the vapor phase, and with a minimum production of undesired products, by proper regulation of the quantities of reactants and the quantity of ultraviolet rays as well as the heat supplied. It is found that, while the reaction starts at lower temperatures, it proceeds best and with higher yields at a temperature above the boiling point of the hydrocarbon, etc.

The present apparatus is distinctly different from the patent to Conklin No. 1,828,859, October 27, 1931, upon Chlorination apparatus, in which the reaction is carried out "in the liquid phase" in a column packed with glass which, with its reflection, refraction and absorption of rays, is substantially impenetrable to the ultraviolet rays used in conducting the reaction, particularly in the vapor phase.

Further objects of my invention will be seen from the detailed description of my invention hereinafter.

While my invention is capable of being carried out in many different ways and in many different types of apparatus, I have shown, by way of illustration, only one type of apparatus for use therewith in the accompanying drawings, in which—

Fig. 1 is a diagrammatic representation of an apparatus in which my invention may be carried out; and Fig. 2 is a vertical section, enlarged, of the all-glass bubble cap column shown in Fig. 1.

In the said apparatus, for example, I have provided a Pyrex or similar all-glass bubble cap column 1. This has, preferably, about twenty sections 2, more or less, made of said Pyrex glass, which are separated by plates 3 of the same material, having central vapor openings 4 containing large tubular risers 5, also of the same material and which extend upwardly into still larger liquid sealed bubble caps 6, made of the same material and each of which is provided with one or more vapor openings or slots 7 at the side thereof away from the upper end of a liquid-conveying downcomer tube 8 of large cross-section, having a liquid inlet opening 9, at its side, located away from the vapor opening 7 of the adjacent bubble cap 6, as well as a vertical guard 10 with an umbrella cover 11 attached thereto situated adjacent to said bubble cap 6 so as to prevent the bubbling and foaming mist, with the vapor pressures present, from disturbing the uniform overflow of the liquid into the downcomer 8 of large cross-sectional area, which has an upwardly flared downwardly directed section 12 within the plate 3 leading to a pipe section 13 of smaller diameter, extending through the next intervening vapor space, which is very high to provide a large vapor space capacity for the large volume of noncondensable gases. The lower or outlet end of the pipe 13 is submerged in the liquid present on the next plate 3.

The column has three or more chlorine inlet pipes 16, 17 and 18 provided with hand valves 19, 20 and 21, respectively, and connected to a chlorine supply pipe 22, fed with chlorine at a constant pressure and preferably preheated, at least initially, to any desired temperatures, for instance 20 to 50° C., and leading, respectively, to the first three lower column sections 2 having the said vapor spaces 14 therein, where the reaction principally takes place. Also, the sections 2 which, as above stated, are made of Pyrex brand resistant glass No. 774 or similar glass to withstand heat and yet be capable of effectively transmitting the ultraviolet rays, the downcomers 8, the guards 10, umbrellas 11, pipe sections 12, 13, bubble caps 6, risers 5 and plates 3, are all made of the same transparent material and are tightly sealed and secured to these different parts by gaskets 23 of "Teflon," which is polytetrafluoroethylene, the gasketing being the same throughout the entire apparatus, as no other gasketing has been found to be completely effective in withstanding the action of the materials present in the reaction. Iron and other metallic ions that might catalyze the nuclear halogenation of the aromatic compounds are carefully avoided in the assembly of the column and its connecting lines.

A single large mercury vapor lamp 24 may be provided outside the lower part of the column 1, or a succession of smaller mercury vapor lamps may be distributed along the entire length of the column 1, and these are provided with individual control switches. The toluene is constantly fed into the column 1 through a pipe 25, by means of a constant level supply from a storage tank 26 having an inlet 27, by a pump 28 and a pipe 29 leading to a constant level feed tank 30, having an overflow pipe 31 leading back to the supply tank 26. A pipe 32 having a hand valve 33 conveys the toluene to a pair of alternative filters 34 and 35 having, respectively, feed pipes 36 and 37 provided with hand valves 38 and 39, as well as draw-off pipes 40 and 41, also provided with hand valves 42 and 43. A pipe 44 with a hand valve 45 conveys the toluene therefrom when desired, through a rotameter 74 of any desired character, having hand valve-controlled inlet and outlet pipes 46 and 47, to the feed pipe 25, provided with a hand valve 48 and a by-pass pipe 49 having a hand-control valve 50 located between two hand valves 51 and 52.

The column 1, at the top thereof, has a pipe 53 for conveying the hydrocarbon-saturated hydrogen chloride produced by the reaction to a Pyrex condenser 54 having a cooling coil 55 and an outlet pipe 56 for the effluent, from which a trapped pipe 57 leads the condensate, comprised almost entirely of toluene, back to the feed pipe 25, while a branch pipe 58 leads to any desired hydrogen chloride recovery unit or absorber (not shown) preferably under a vacuum of 1½" of water to avoid danger from accumulated pressures. Also, a pipe 59, connected to the pipe 58, has hand valve controlled branches 60 and 61 leading, respectively, from two lead-lined receivers 62 and 63 having hand valve controlled air vent pipes 64 and 65 and hand valve controlled liquid draw-off pipes 66 and 67, respectively, leading to any desired distillation and/or washing apparatus (not shown) for separating the constituent products. The containers 62 and 63 receive the liquid, comprising the halogenation reaction product or products, by means of a trapped pipe 68 connected to the bottom of the column 1 and having a hygrometer chamber 69 with a hand-valved draw off pipe 70, the outlet side of which is connected by a pipe 71 to hand-valved branch pipes 72 and 73 leading into the top of the receivers 62 and 63, respectively.

As particular examples of the procedure in operating the apparatus made in accordance with my invention, I may, for instance and by way of illustration, proceed as follows:

*Example I.—Chlorination of toluene*

Toluene is added to the column 1 at the nineteenth plate from the bottom at the rate of about 65 parts by weight per hour while chlorine gas, having a temperature of 2–50° C., is admitted at the fourth plate from the bottom at the rate of about 50 parts by weight per hour. Ultraviolet radiation, controlled by switching on or off the different mercury vapor lamps, is used in an amount of 30.7 watts per part by weight, in pounds for example, of toluene fed, although different proportions can be used, if desired, to illuminate the chlorination area mainly in the lower ⅓ of the column 1. The temperature of the reaction zone starts at about 45° C. and is maintained approximately between 110–160° C., which temperature should preferably be about 123° C. The hydrogen chloride gas formed during the reaction, after separating the toluene therefrom and returning it to the column 1 by the pipe 57, is removed by the pipe 58 to a recovery plate, with the aid of a vacuum of about 1½", that is to say preferably from 1 to 3" of water at the top of the column. The control of the column is attained by controlling the feed of the toluene and chlorine, respectively, and the application of the ultraviolet rays to the column.

When the column has reached equilibrium the product collected in the receivers 62 and 63 contains by weight about 85% of benzyl chloride and about 15% of benzal chloride. Consequently, there is substantially no free toluene or benzotrichloride present. It is apparent from the Example III (a) that, instead, toluene could be chlorinated completely as is the p-chlorotoluene, to the benzotrichloride stage.

*Example II.—Chlorination of p-xylene* p-Xylene is run by the pipe 25 at the rate of 51.6 parts by weight per hour into a column 1 similar to that described above but having smaller capacity. At the same time chlorine is introduced from the pipe 22 at a lower level in the column at a rate sufficient to allow for the chlorination of 50% of the xylene to xylylene dichloride. The column is illuminated with 3.88 watts of ultraviolet light per part by weight of p-xylene fed, by the mercury vapor lamps 24. During the reaction, the reaction zone of the column is maintained at a temperature somewhere between 130–170° C., which should preferably be about 150° C. The product withdrawn from the bottom of the reactor contains by weight 12.5% of unreacted p-xylene, 60% of p-xylyl chloride, 24.5% of p-xylylene dichloride, and 3% of higher chlorinated materials.

*Example III.—Chlorination of p-chlorotoluene*

(a) When metal-free p-chlorotoluene is fed into the top of the apparatus similar to the one described above at the rate of 238 parts by weight per hour and chlorine at 380 parts by weight per hour into the column 1 at a lower level thereof and the reaction allowed to proceed at a temperature of about 180° to 220° C., which should preferably be from 200° to 210° C., while illumination is provided by sufficient ultraviolet radiation, a product is obtained which contains by weight 98% of p-chlorobenzotrichloride.

(b) Metal-free p-chlorotoluene and chlorine are fed into the column 1 at the rate of 1733 parts by weight per hour and 330 parts by weight per hour, respectively. The temperature of the reaction zone is maintained at from 140° to 170° C., and which should preferably be at about 160° C., while illumination is provided by ultraviolet radiation. The product withdrawn from the bottom of the column contains by weight 91% of p-chlorobenzyl chloride, 5% of p-chlorobenzal chloride and 4% of p-chlorotoluene.

Example IV.—Chlorination of o-chlorotoluene

The apparatus used in this example consists of a series arrangement of two fifteen-plate bubble cap columns of the type described above. o-Chlorotoluene is fed to the fifteenth plate from the bottom of the first column at the rate of 1950 parts by weight per hour while 370 parts by weight of chlorine per hour is admitted to the fifth plate from the bottom. The temperature in the reaction zone is maintained at from 120 to 170° C., and which should preferably be at about 160° C. The product obtained when the columns have reached equilibrium is distilled, and the cut boiling at 50–56° C. at 2 mm. pressure, when degassed and redistilled, is found to contain by weight 94% of o-chlorobenzyl chloride and 6% of o-chlorobenzal chloride. No o-chlorobenzotrichloride or o-chlorotoluene is found in the product.

In the applicant's apparatus, in view of the fact that the reaction of halogenation takes place mainly in the vapor phase, that is to say in the large capacity vapor spaces 14, where the vapors present contain a larger percentage of the hydrocarbon or other compounds to be chlorinated than the liquid on the plates 3, respectively, a more effective and complete halogenation is accomplished, inasmuch as the droplets of the halogenation product formed therein coalesce and are being continually removed from the vapor spaces to be added to the body of liquid beneath the same on each plate, while these droplets are being replaced by the hydrocarbon vapors, which are at a temperature above the boiling point of the latter. I have found that the compound which exists in the greatest concentration in the vapor phase will be chlorinated to the greatest extent, and as toluene has a higher vapor pressure than benzyl chloride, this avoids as far as possible introducing more than the desired number of halogen atoms into the compound to be chlorinated. For instance, the condensation is such as to remove continually benzyl chloride from the vapors before benzal chloride is formed therefrom. Also, the high yield obtained is aided, for instance, by controlling, in the vapor phase to between 110° and 160° C. in toluene chlorination, the temperature of the reaction, which, however, takes place from 10° C. up to the reflux temperature of the final product, although the minimum starting temperature is preferably not below 45 to 50° C. However, the lower the temperature the less will be the rate of chlorination. Also, the intensity and position of the ultraviolet lamps used is important in contributing to the best results as to yields and in effectively penetrating the vapor spaces, which are substantially unobstructed by liquid and solid materials that would tend to divert or disperse disadvantageously the ultraviolet rays by reflection, refraction, absorption, etc. Under these circumstances, I do not find it necessary to illuminate the column uniformly as it is found satisfactory to illuminate principally the lower third part of the column starting at the lowermost chlorine feed plate and extending upwardly therefrom. Furthermore, too much of the ultraviolet light causes the column to run unsteadily and with a lack of uniformity, whereas too little light, or in the wrong location, will tend to delay or prevent the reaction from starting or will not allow stable equilibrium conditions to be attained therein. Furthermore, conditions approaching the stoichiometric ratio of the halogen and hydrocarbon being fed should be maintained as far as possible for the best results.

Furthermore, the purity of the raw materials used is of great importance in order to obtain the desired strength of the products and even in starting the reaction. Chlorine made by the electrolytic process and freed of inorganic contaminants is found to be very suitable. A good grade of coal tar toluene with a fairly narrow boiling range is very suitable especially if freed of water and impurities such as iron or other metal ions, which may undesirably catalyze the chlorination.

While I have described my invention above in detail I wish it to be understood that many changes may be made therein without departing from the spirit of the same.

I claim:

1. An apparatus for producing a halo-alkyl substituted benzene, which comprises an all-glass bubble cap column accessible to actinic rays having successive plates with interconnecting liquid-conveying downcomers, the lower portion of said downcomers being located below the liquid surface of the lower plate, the vapor space between said plates predominating over the liquid capacity, and in which the bubble caps are free from vapor openings near said downcomers.

2. An apparatus for producing a halo-alkyl substituted benzene, which comprises an all-glass bubble cap column accessible to actinic rays having successive plates with interconnecting liquid-conveying downcomers, the lower portion of said downcomers being located below the liquid surface of the lower plate, the vapor space between said plates predominating over the liquid capacity, and in which the bubble caps are free from vapor openings near said downcomers, the bubble caps being provided with slots for this purpose located on their sides opposite to the location of said downcomers.

3. An apparatus for producing a halo-alkyl substituted benzene, which comprises an all-glass bubble cap column accessible to actinic rays, the vapor space between the plates predominating over the liquid capacity and in which the successive plates are interconnected by liquid conveying downcomers, the lower portion of said downcomers being located below the liquid surface of the lower plate, said downcomers having flared upper ends provided with umbrella like covers supported from said upper ends by shields at their sides located near said bubble caps.

4. An apparatus for producing a halo-alkyl substituted benzene, which comprises an all-glass bubble cap column accessible to actinic rays having successive plates with interconnecting liquid-conveying downcomers, the lower portion of said downcomers being located below the liquid surface of the lower plate, the vapor space between said plates predominating over the liquid capacity, and in which the bubble caps are free from vapor openings near said downcomers, selective ultra-violet ray lamps being located externally to the lower end of said column.

5. An apparatus for producing a halo-alkyl substituted benzene, which comprises an all-glass bubble cap column accessible to actinic rays having successive plates with interconnecting liquid-conveying downcomers, the lower portion of said downcomers being located below the liquid surface of the lower plate, the vapor space between said plates predominating over the liquid capacity, and in which the bubble caps are free from vapor openings near said downcomers, said bubble caps being provided with slots for this purpose located on their sides opposite to the location of said downcomers and selective ultra-violet ray lamps are located externally to the lower end of said column.

6. An apparatus for producing a halo-alkyl substituted benzene, which comprises an all-glass bubble cap column accessible to actinic rays, the vapor space between the plates predominating over the liquid capacity and in which the successive plates are interconnected by liquid conveying downcomers, the lower portion of said downcomers being located below the liquid surface of the lower plate, said downcomers having flared upper ends provided with umbrella like covers supported from said upper ends by shields at their sides located near said bubble caps and selective ultra-violet ray lamps are located externally to the lower end of said column.

HENRY J. NOEBELS.

REFERENCES CITED

The following references are of record in the file of this patent:

UNITED STATES PATENTS

| Number | Name | Date |
|---|---|---|
| 1,432,761 | Koch | Oct. 24, 1922 |
| 2,396,900 | Taggart, Jr. | Mar. 19, 1946 |

FOREIGN PATENTS

| Number | Country | Date |
|---|---|---|
| 435,656 | France | Mar. 7, 1912 |

OTHER REFERENCES

Glass Color Filters, Catalog C112, Corning Glass Works, Corning, N. Y., June 1934.